(12) United States Patent
Hishida et al.

(10) Patent No.: US 11,404,930 B2
(45) Date of Patent: Aug. 2, 2022

(54) INSULATOR, AND STATOR AND MOTOR COMPRISING SAME

(71) Applicant: PANASONIC INTELLECTUAL PROPERTY MANAGEMENT CO., LTD., Osaka (JP)

(72) Inventors: Mitsuoki Hishida, Osaka (JP); Hiroshi Yoneda, Osaka (JP); Hirokatsu Kunitomo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 16/645,773

(22) PCT Filed: May 25, 2018

(86) PCT No.: PCT/JP2018/020203
§ 371 (c)(1),
(2) Date: Mar. 9, 2020

(87) PCT Pub. No.: WO2019/058643
PCT Pub. Date: Mar. 28, 2019

(65) Prior Publication Data
US 2020/0259385 A1 Aug. 13, 2020

(30) Foreign Application Priority Data
Sep. 20, 2017 (JP) .............................. JP2017-180486

(51) Int. Cl.
*H02K 3/52* (2006.01)
*H02K 1/27* (2022.01)
(Continued)

(52) U.S. Cl.
CPC ............. *H02K 3/522* (2013.01); *H02K 1/146* (2013.01); *H02K 1/276* (2013.01); *H02K 21/16* (2013.01); *H02K 2203/12* (2013.01)

(58) Field of Classification Search
CPC ........ H02K 1/146; H02K 1/276; H02K 21/14; H02K 21/16; H02K 2203/12; H02K 3/34;
(Continued)

(56) References Cited

U.S. PATENT DOCUMENTS 6,356,001 B1 3/2002 Nishiyama et al.
2004/0263015 A1 12/2004 Okada et al.
(Continued)

FOREIGN PATENT DOCUMENTS

JP H11-122855 A 4/1999
JP 2002-354738 A 12/2002
(Continued)

OTHER PUBLICATIONS

International Search Report and Written Opinion issued in International Patent Application No. PCT/JP2018/020203, dated Aug. 14, 2018; with partial English translation.
(Continued)

*Primary Examiner* — Alex W Mok
(74) *Attorney, Agent, or Firm* — McDermott Will & Emery LLP

(57) ABSTRACT

An insulator includes a part to be wound with a coil, a first flange, and a second flange. The first flange is formed at the side of the part closer to a core segment, and includes a coil guide groove that guides the coil to the part. The second flange is formed at the side closer to a distal end of a tooth. The coil guide groove includes a first groove extending at an acute angle θ from an inner surface of the first flange.

15 Claims, 14 Drawing Sheets

(51) Int. Cl.
*H02K 1/14* (2006.01)
*H02K 21/16* (2006.01)
*H02K 1/276* (2022.01)

(58) Field of Classification Search
CPC .......... H02K 3/46; H02K 3/522; H02K 1/148; H02K 3/325; H01F 27/306; H01F 27/325; H01F 5/02
USPC .................................................. 310/156.56
See application file for complete search history.

(56) References Cited

U.S. PATENT DOCUMENTS

2005/0029891 A1  2/2005  Okada et al.
2012/0104893 A1  5/2012  Kitaori et al.
2013/0009512 A1  1/2013  Tashiro et al.
2016/0043604 A1* 2/2016  Yoshida ................. H02K 15/12
                                                          310/71

FOREIGN PATENT DOCUMENTS

| | | |
|---|---|---|
| JP | 2006-115565 A | 4/2006 |
| JP | 2008-043106 A | 2/2008 |
| JP | 2008-278694 A | 11/2008 |
| JP | 2013-243800 A | 12/2013 |
| JP | 2013-247698 A | 12/2013 |
| JP | 2016-116418 A | 6/2016 |
| JP | 2017-017784 A | 1/2017 |
| WO | 2011/118357 A1 | 9/2011 |

OTHER PUBLICATIONS

Extended European Search Report issued in European Patent Application No. 18859265.3, dated Oct. 14, 2020.

* cited by examiner

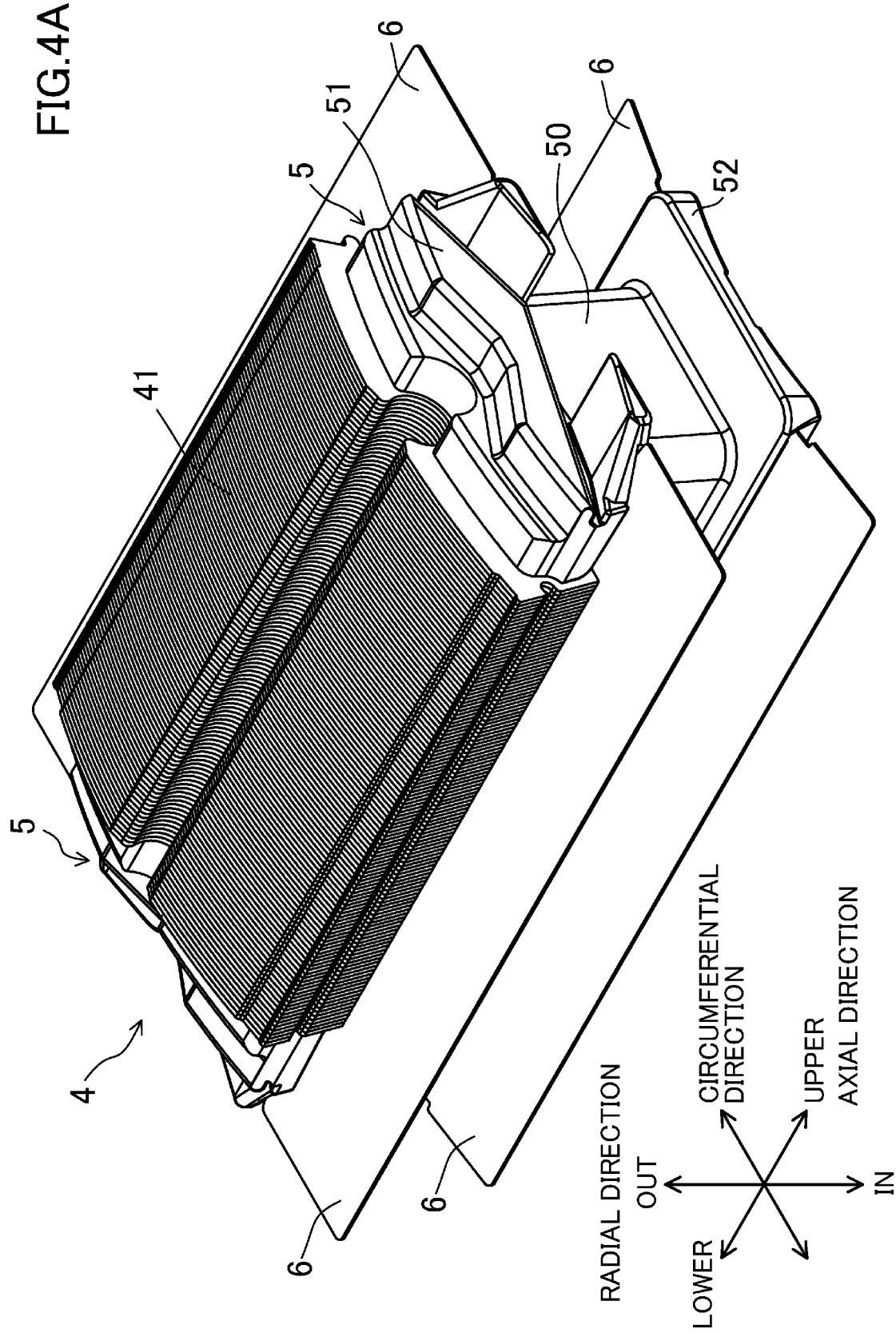

FIG.4C
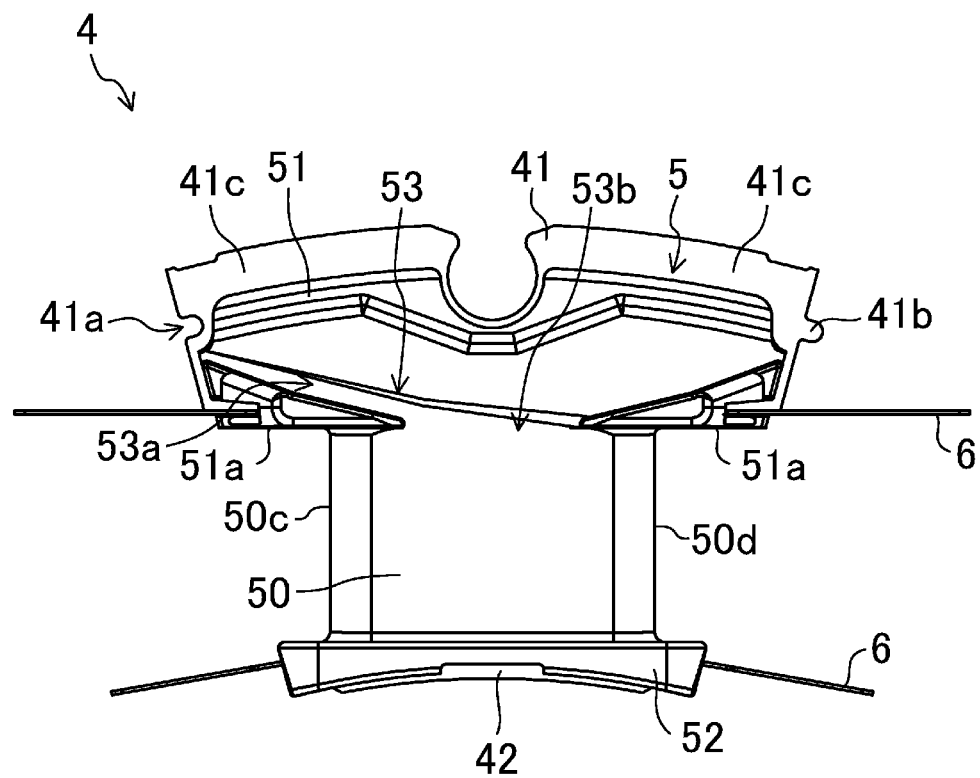
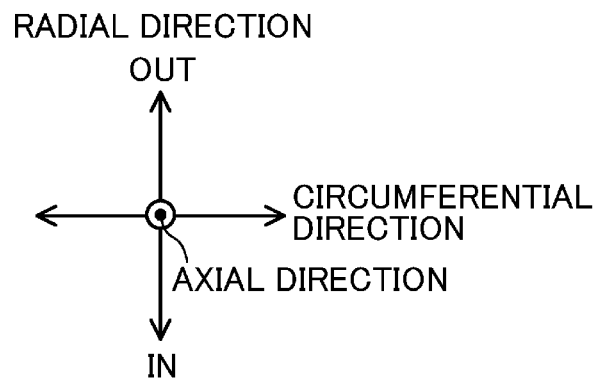

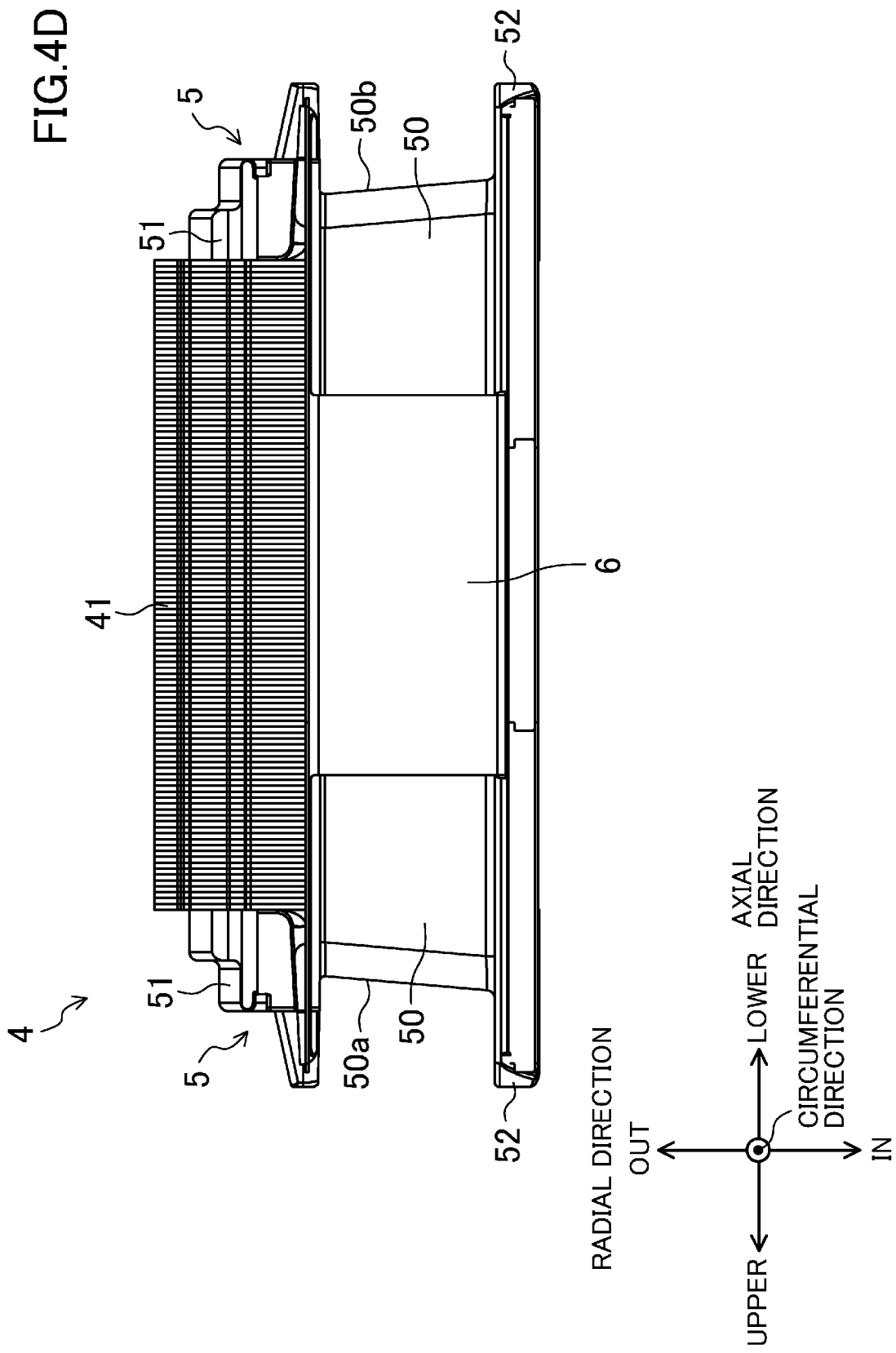

FIG.5A
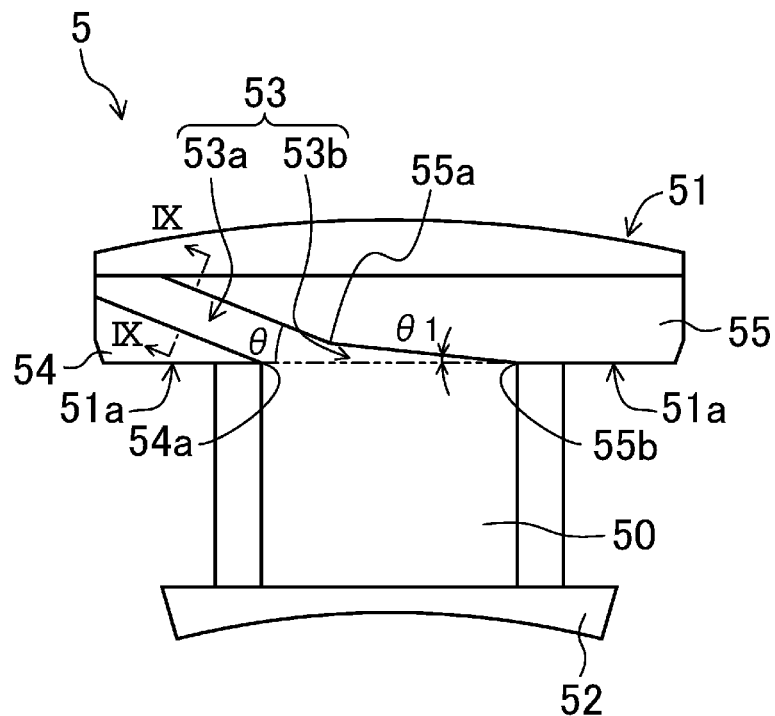
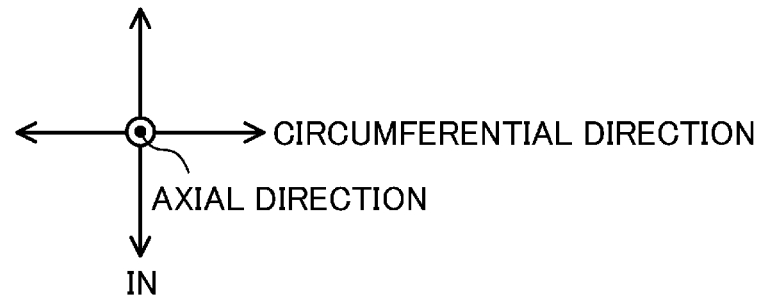

FIG.5B
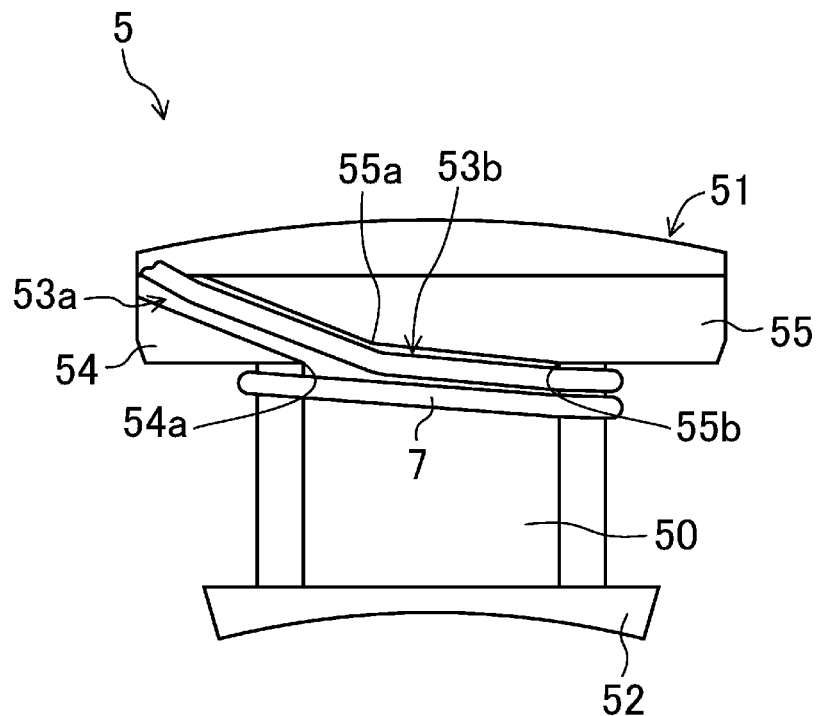
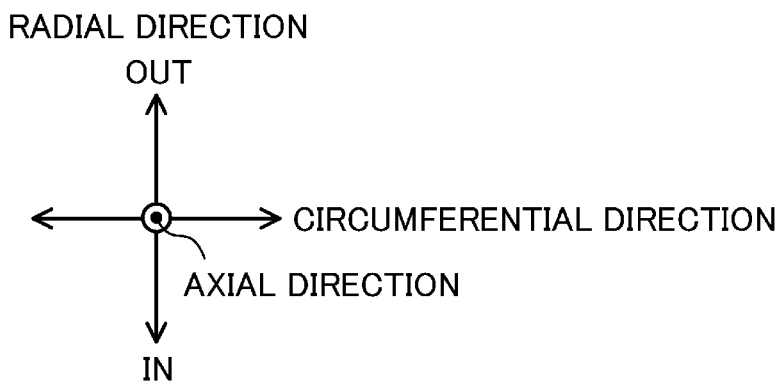

FIG.6A
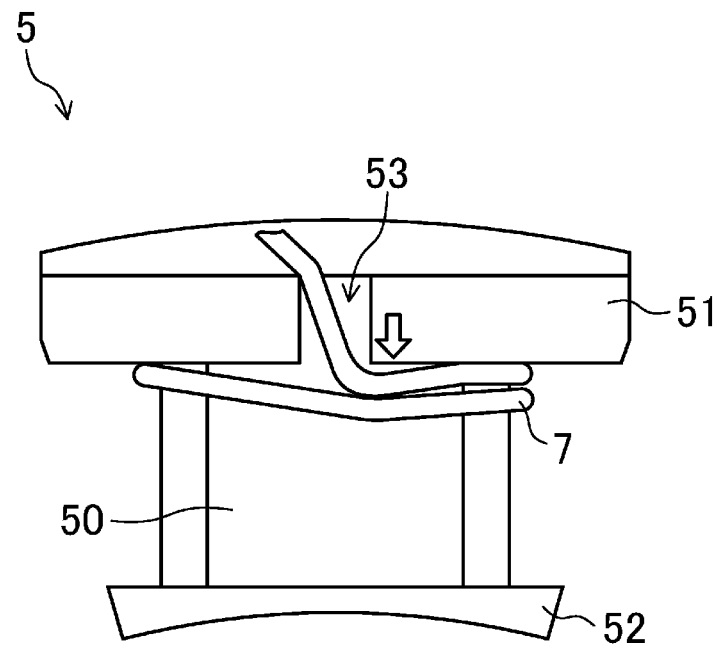
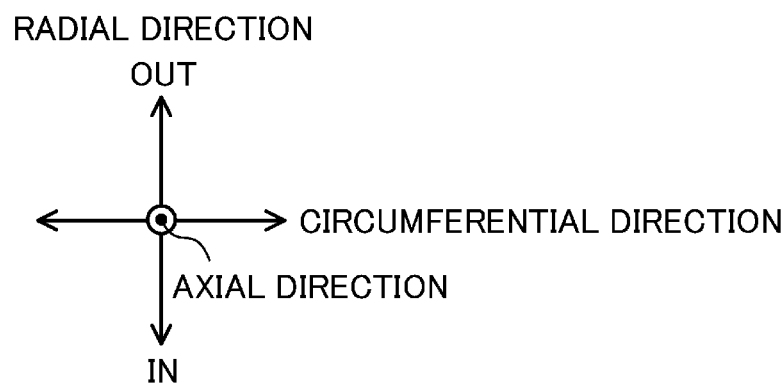

FIG.6B
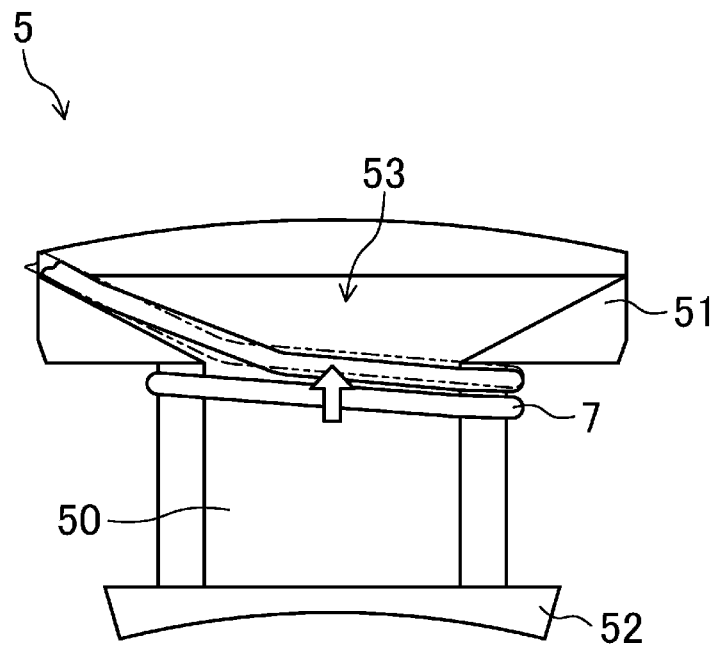
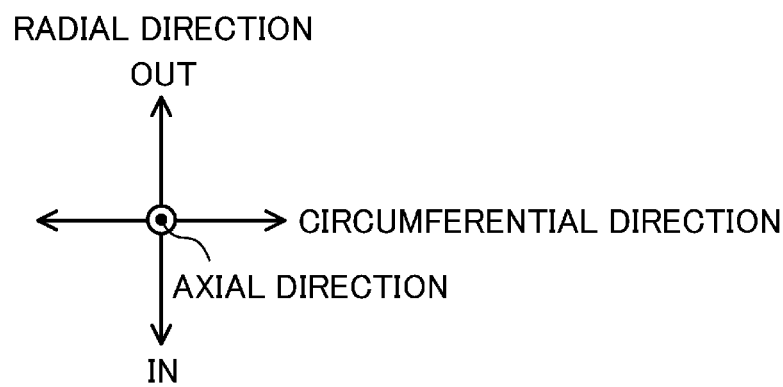

FIG.7
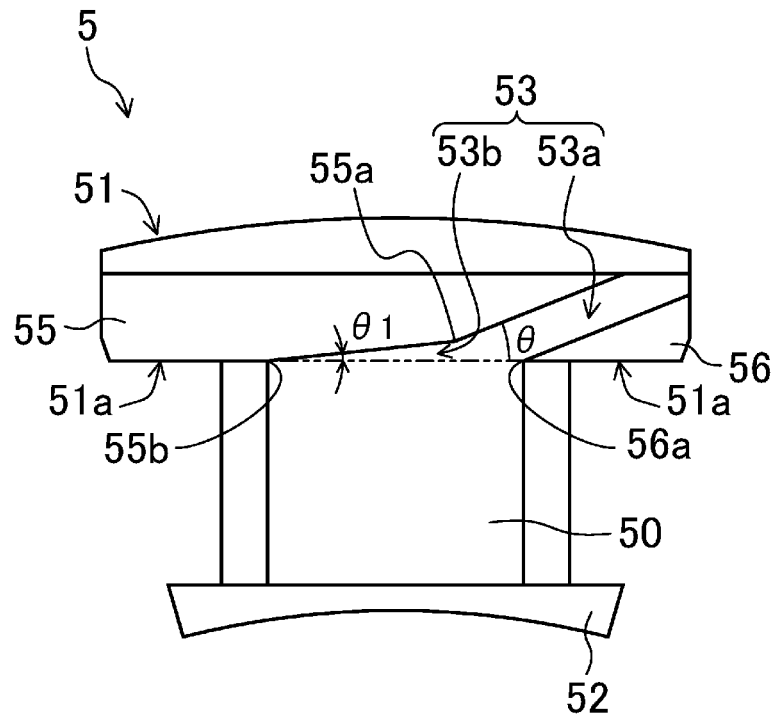
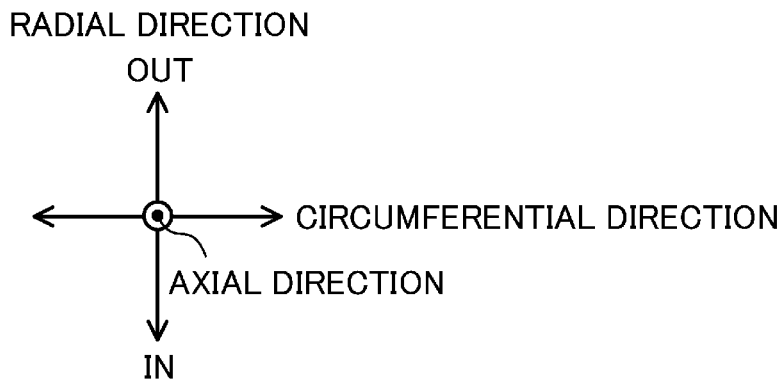

FIG.8
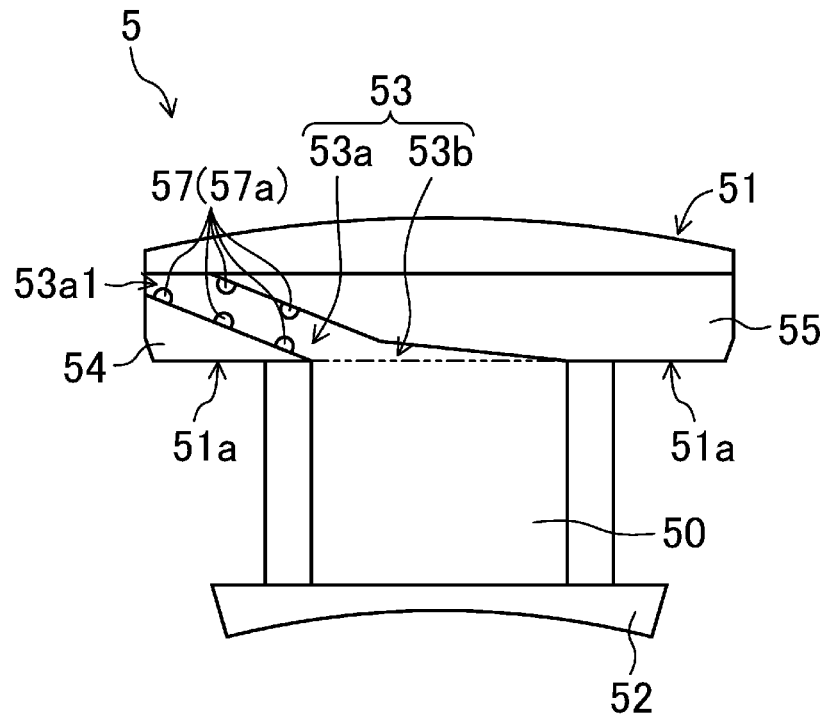
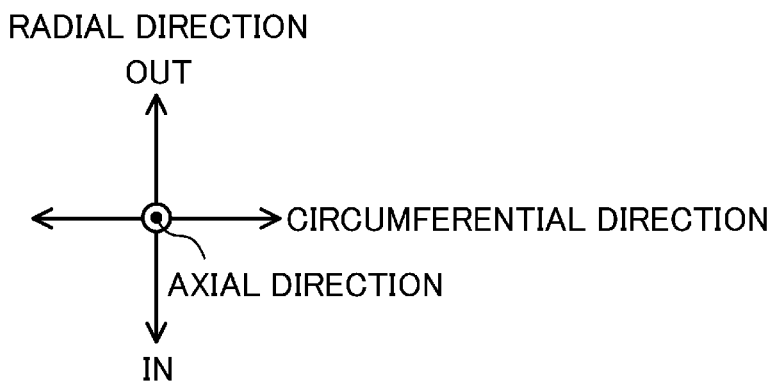

INSULATOR, AND STATOR AND MOTOR COMPRISING SAME

CROSS-REFERENCE OF RELATED APPLICATIONS

This application is the U.S. National Phase under 35 U.S.C. § 371 of International Patent Application No. PCT/JP2018/020203, filed on May 25, 2018, which in turn claims the benefit of Japanese Application No. 2017-180486, filed on Sep. 20, 2017, the entire disclosures of which Applications are incorporated by reference herein.

TECHNICAL FIELD

The present invention relates to an insulator wound with a coil, a stator including the insulator, and a motor.

BACKGROUND ART

In recent years, there is an increasing demand for motors for industrial and in-vehicle applications. In particular, there is a demand for an improvement in the efficiency and a reduction in the costs of the motors.

An increase in the space factor of a coil disposed in the slot of a stator is known as one method of improving the efficiency of a motor. An increase in a coil space factor reduces a loss caused by a current flowing through the coil when the motor is driven.

Coils regularly wound around teeth of a stator are generally known as a structure improving a coil space factor. Various configurations are suggested to achieve such coils (see, e.g., Patent Documents 1 to 4). For example, Patent Document 1 suggests achieving a regularly wound coil by forming a step or a slope inside a flange at one or each end of the cylinder of an insulating coil bobbin wound with a coil. Patent Document 2 discloses achieving a regularly wound coil by forming a groove for holding a wound coil in a side surface of an insulator that is attached to a tooth to insulate the coil from the tooth.

CITATION LIST

Patent Document

PATENT DOCUMENT 1: Japanese Unexamined Patent Publication No. H11-122855
PATENT DOCUMENT 2: Japanese Unexamined Patent Publication No. 2006-115565
PATENT DOCUMENT 3: U.S. Pat. No. 6,356,001
PATENT DOCUMENT 4: PCT International Publication No. WO 2011/118357

SUMMARY

Technical Problem

The insulators and coil bobbins in the documents cited above are generally formed by molding resin materials using molds. On the other hand, the performance of a motor may vary depending on user specifications. Thus, even if the same stator core and teeth are used, the diameter of a coil and the number of turns are varied to adjust, for example, the value of the current flowing through the coil in most cases so that the performance of the motor meets the individual specifications.

However, the conventional configurations disclosed in Patent Documents 1 and 2 require a change in the width of the holding groove in accordance with the diameter of the coil or change the width of the step or the angle of the slope. It is thus necessary to reform the mold to form an insulator each time, thereby increasing the costs.

The present invention was made in view of the above problems. It is an objective of the present invention to provide an insulator regularly woundable with a coil, even if the diameter of the coil is changed.

Solution to the Problem

In order to achieve the objective, an insulator according to the present invention has a coil guide groove that allows a coil to obliquely enter a part to be wound with the coil as viewed in the axial direction.

Specifically, the insulator according to the present invention includes: a part to be wound with a coil, the part covering an axial end surface of a tooth protruding from a core segment and a part of at least both circumferential side surfaces of the tooth; a first flange continuous with the part to be wound with the coil at one of sides closer to a proximal end and a distal end of the tooth, and including a coil guide groove that guides the coil to the part to be wound with the coil; and a second flange continuous with the part to be wound with the coil at the other of the sides closer to the proximal end and the distal end of the tooth. The coil guide groove includes a first groove extending at an acute angle θ from an inner surface of the first flange facing the second flange.

According to this configuration, even if a coil with a different diameter is wound around the insulator, the winding starting part of the coil is regularly woundable around the part to be wound with the coil, thereby achieving a regularly wound coil as a whole.

In one preferred embodiment, the coil guide groove further includes a second groove continuous with the first groove and located radially more inward in relation to the first groove, and an angle θ1 between a radially outer side surface of the second groove and the inner surface is acute and smaller than or equal to the angle θ.

This configuration gradually reduces the angle at which the coil enters the part to be wound with the coil, and allows the coil to be further along the inner surface of the first flange.

In one preferred embodiment, the coil guide groove includes a coil lock that locks a winding starting part of the coil.

This configuration reduces deformation or movement of the winding starting part of the coil. This improves the regularity of the winding start part of the coil, thereby easily providing a regularly wound coil.

In one preferred embodiment, the coil lock is a protrusion from a side surface of the coil guide groove, and the coil guide includes one or more protrusions including the protrusion.

This configuration reduces slack of the winding starting parts of the coils with different diameters and allows reliable locking of the coils in the insulators, thereby easily providing regularly wound coils.

The coil guide groove may be a groove tapered toward a bottom. The tapered groove may serve as the coil lock. The coil lock may be located at an inlet of the coil guide groove.

This configuration reduces slack of the winding starting parts of the coils with different diameters and allows reliable locking of the coils in the insulators, thereby easily providing regularly wound coils.

The stator according to the present invention includes: insulators, each being the insulator, on both axial end surfaces of teeth, each of which is the teeth of the core segment; and a plurality of stator segments, each formed by winding the coil of a winding wire around the part to be wound with the coil of the insulator. The stator segments are connected to each other in a ring, and the teeth protrude radially inward in the ring.

This configuration increases the coil space factor in the stator.

In one preferred embodiment, the coil is regularly wound around the part to be wound with the coil.

In one preferred embodiment, a space between circumferentially adjacent ones of the teeth serves as a slot that houses the coil, and in the slot, insulating paper configured to insulate each of the core segments and each of the teeth from the coil covers a side surface of the one of the teeth and partially overlaps the first and second flanges of the insulator in the axial direction.

This configuration allows for reliable electrical insulation between the teeth adjacent to each other along the circumference of the stator.

The motor according to the present invention at least includes: the stator; and a rotor including a rotary shaft located more radially inward in relation to the stator at a predetermined distance.

This configuration increases the coil space factor in the stator, and improves the efficiency of the motor.

Advantages of the Invention

As described above, the present invention achieves regularly wound coils even with different diameters, while reducing winding failure.

BRIEF DESCRIPTION OF THE DRAWINGS

FIG. 4A is a perspective view of the part surrounded by a broken line shown in FIG. 1.

FIG. 4C is a top view of the structure shown in FIG. 4A as viewed in an axial direction.

FIG. 4D is a side view of the structure shown in FIG. 4A as viewed in a circumferential direction.

FIG. 5A is a schematic view of a main part of an insulator according a first embodiment as viewed in the axial direction.

FIG. 5B is a schematic view of the main part of the insulator wound with a coil according to the first embodiment, as viewed in the axial direction.

FIG. 6A is a schematic view of a main part of a comparative insulator wound with a coil, as viewed in the axial direction.

FIG. 6B is a schematic view of a main part of another comparative insulator wound with a coil, as viewed in the axial direction.

FIG. 7 is a schematic view of a main part of another insulator according to the first embodiment as viewed in the axial direction.

FIG. 8 is a schematic view of a main part of an insulator according to a second embodiment as viewed in the axial direction.

DESCRIPTION OF EMBODIMENTS

Embodiments of the present disclosure will now be described in detail with reference to the drawings. The following embodiments are merely exemplary ones in nature, and are not intended to limit the scope, applications, or use of the invention.

First Embodiment

Configurations of Motor and Stator

Figure 1:
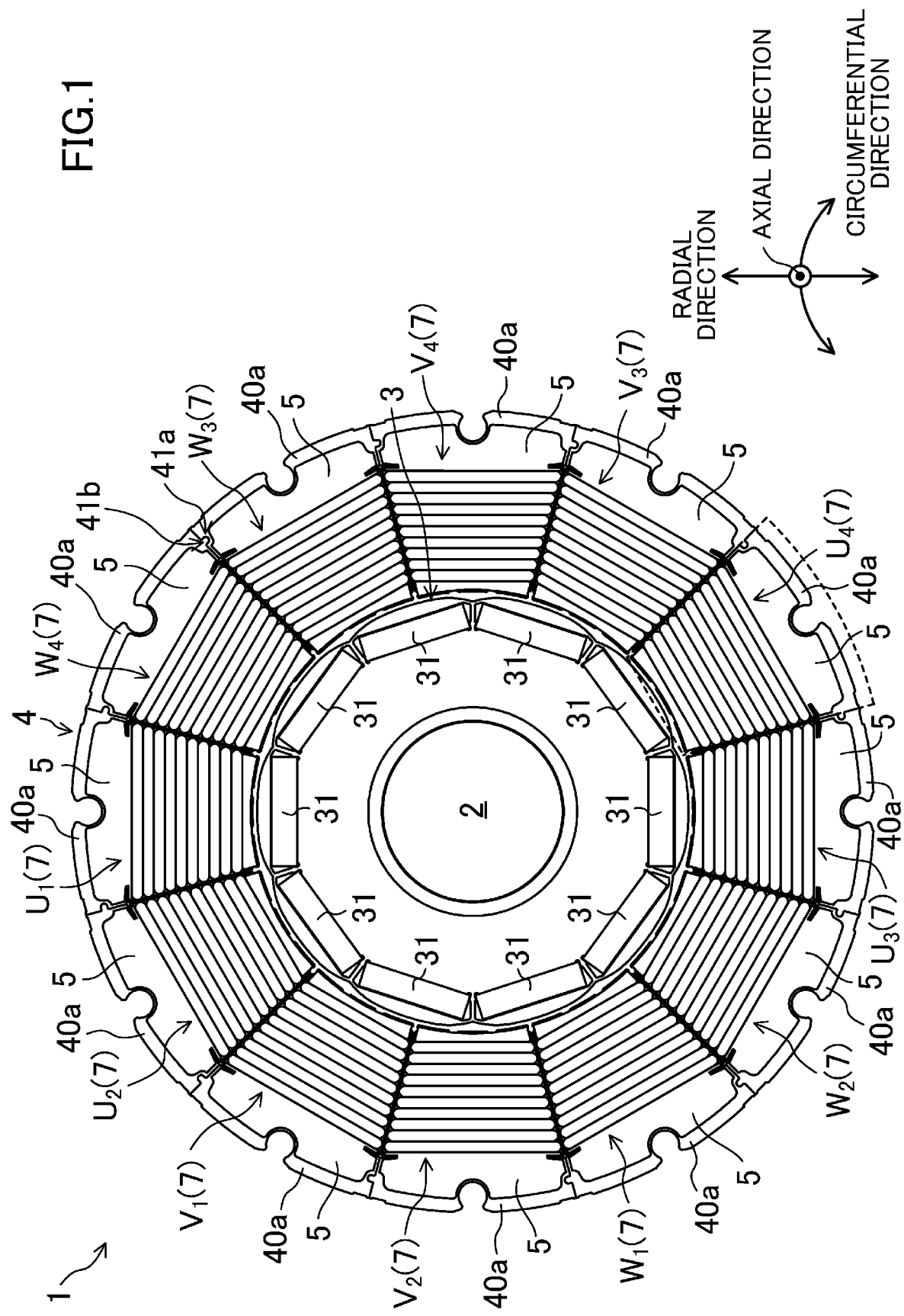
FIG. 1 is a top view of a motor according to a first embodiment.
Figure 2:
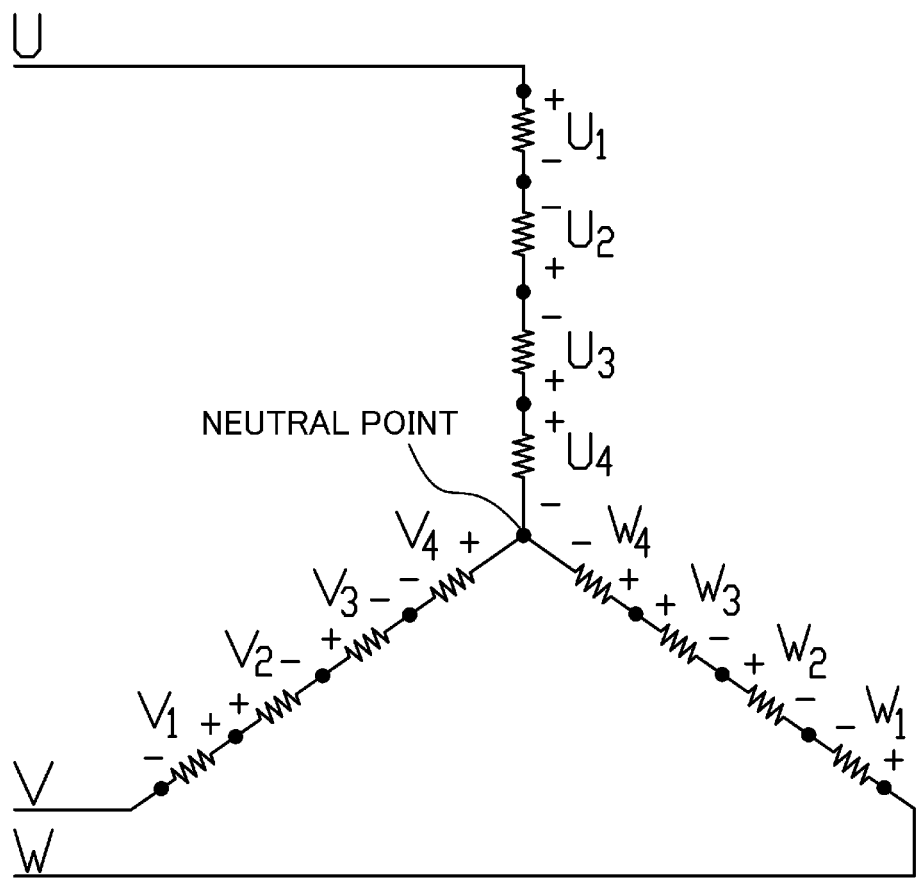
FIG. 2 is an equivalent circuit diagram of the motor shown in FIG. 1.
Figure 3:
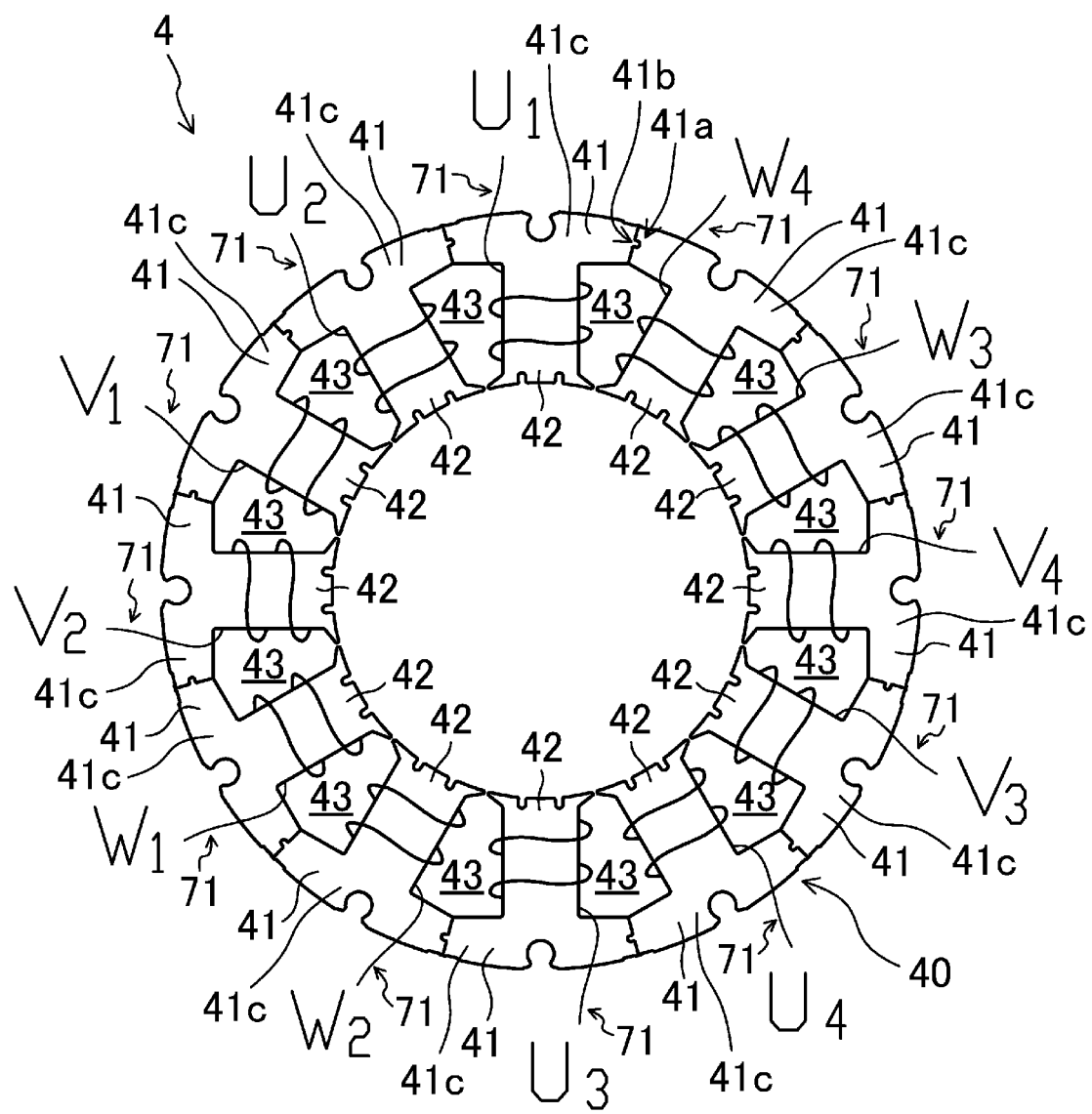
FIG. 3 is a general schematic view of a stator.

FIG. 1 is a top view of a motor according to this embodiment. FIG. 2 is an equivalent circuit diagram of the motor shown in FIG. 1. FIG. 3 is a general schematic view of a stator 4 as viewed along the axis of a shaft 2. For convenience of description, some components and their functions are not shown in FIGS. 1 and 3 and description thereof will be omitted. For example, frames and bus bars are not shown. FIG. 3 does not show an insulator 5. An exterior body housing the stator 4 is also not shown. The exterior body is, for example, a cylinder, a substantial cuboid, a substantially rectangular cuboid, or a polygonal prism made of metal. The shape is selected as appropriate in accordance with the specifications of a motor 1. The components are simply shown. For example, the shapes of the insulators 5 shown in FIG. 1 are partially different from the actual shapes. The shapes of the coils U1 to W4 and their lead terminals 71 shown in FIG. 3 are largely different from the actual shapes. In FIG. 2, symbols + indicate the start of winding of coils, whereas symbols − indicate the end of winding of the coils.

In the following description, the longitudinal direction of the shaft 2 may be referred to as an axial direction, the radial direction of the stator 4 as a radial direction, and the circumferential direction of the stator 4 as a circumferential direction. In the axial direction, each of the coils U1 to W4 has a lead terminal 71 on its top, which may be referred to as an upper side, whereas the opposite as a lower side. In the radial direction, the stator 4 has the shaft 2 and a rotor at its center, which may be referred to as an inner side, whereas the opposite where a stator core 40 is located as an outer side.

The direction in which electromagnetic steel sheets, which will be described later, are stacked is the same as the axial direction, which are used as synonymous.

In the following description, the terms "tooth" and "teeth" (the plural of tooth) will be used separately. A plurality of teeth protruding toward the center of a ring stator core are referred to as teeth 42 (the plural of tooth). Each of the teeth of the stator core 40 is referred to as a tooth 42. Similarly, a plurality of teeth of core segments 41 are referred to as teeth 42, which will be described later. Each of the teeth of the core segments 41 is referred to as a tooth 42. Patent Documents 3 and 4 described above are known documents using the terms "tooth" and "teeth" (the plural of tooth) separately.

The motor 1 includes a rotor 3, the stator 4, and the coils U1 to W4 inside the exterior body (not shown). The rotor 3 includes the shaft 2 as the rotation axis of the motor 1.

The rotor 3 is in contact with the outer circumference of the shaft 2, and includes magnets 31 facing the stator 4, with N and S poles arranged alternately along the outer circumference of the shaft 2. While the magnets 31 used for the rotor 3 are neodymium magnets in this embodiment, the material, shape, and characteristics of the magnets may be changed as appropriate in accordance with the output of the motor, for example. As viewed in the axial direction, the rotor 3 is disposed more radially inward than the stator 4 at a certain distance.

The stator 4 is in the shape of a cylinder formed by connecting a plurality of stator segments 40a in a ring. Each of the stator segments 40a is formed as follows. The insulators 5 are attached to both the upper and lower end surfaces of the tooth 42 of each core segment 41 in the axial direction. Insulators such as insulating paper 6 are attached between the insulators 5. A winding wire is wound around the part 50 of each insulator 5 wound with a coil and the part of the insulating paper 6 provided with the insulator to form the coil U1, for example. The appearance shape of the stator segment 40a formed as described above is a column with a substantially sector cross section.

The stator 4 and the stator segments 40a include the plurality of core segments 41 and teeth 42 protruding radially inward from the inner peripheries of the respective core segments 41. Each core segment 41 is a multilayer of plate bodies (i.e., core segment sheets) punched out of an electromagnetic steel sheet containing, for example, silicon. The plate bodies (i.e., core segment sheets) are pieces constituting a part of the substantially ring stator core plate body (i.e., a stator core sheet). The appearance of each core segment 41 configured as described above is a column with a cross section in the shape of a piece constituting the part of the substantially ring stator core plate body (i.e., the stator core sheet). The plate bodies are stacked in the normal direction of the surfaces of the plate bodies. Each core segment 41 includes a yoke 41c and one of the teeth 42 protruding from a substantial center of the yoke 41c.

Each core segment 41 has a recess 41a in one circumferential side surface of the yoke 41c, and a projection 41b in the other. Both the recess 41a and the projection 41b extend axially over the side surfaces. Focusing on one core segment 41 (here referred to as "this core segment 41"), the projection 41b of the core segment 41 circumferentially adjacent to this core segment 41 on one side is fitted into the recess 41a of this core segment 41. The projection 41b of this core segment 41 is fitted into the recess 41a of the core segment 41 circumferentially adjacent to this core segment 41 on the other side. Accordingly, the core segments are connected. In this manner, circumferentially adjacent core segments 41 are fitted into and connected to each other to form the ring stator core 40.

As shown in FIGS. 1 and 3, the core segments 41 are connected to each other to form the ring stator core 40, thereby arranging the teeth 42 at equal intervals along the inner circumference of the stator core 40. The gaps between the circumferentially adjacent teeth 42 serve as slots 43.

The stator 4 includes twelve coils U1 to W4, which are attached to the teeth 42 through the insulators 5 and the insulating paper 6 (see FIGS. 4A to 4D) and are disposed in the slots 43 as viewed in the axial direction. Although not shown, the coils U1 to W4 are winding wires made of a metal material, such as copper, with a surface coated with an insulator film, and having a circular cross section. The coils U1 to W4 are wound around insulators 5 by multilayer regular winding. The term "circular" meant here includes a machining tolerance of the wire and deformation of the wire when being wound around each tooth 42. This applies to the following description. In the following description, unspecified one of the coils U1 to W4 representing their structure and other features is referred to as a coil 7.

As shown in FIG. 2, the coils U1 to U4, V1 to V4, and W1 to W4 are connected in series, and the three U, V and W phases are star-connected. The coils U1 to U4, V1 to V4, and W1 to W4 are supplied with currents of the three U, V and W phases, respectively, with a phase difference corresponding to an electrical angle of 120° and excited to generate a rotating magnetic field. This rotating magnetic field generates torque in the rotor 3, and the shaft 2 is supported by a bearing (not shown) and rotate.

In this embodiment, the number of magnetic poles of the rotor 3 is ten: five N poles opposed to the stator 4 and five S poles, whereas the number of slots 43 is twelve. The numbers are not limited thereto and other number combinations of the magnetic poles and slots are also applicable.

[Configurations of Core Segment and Main Part of Insulator]

Figure 4B:
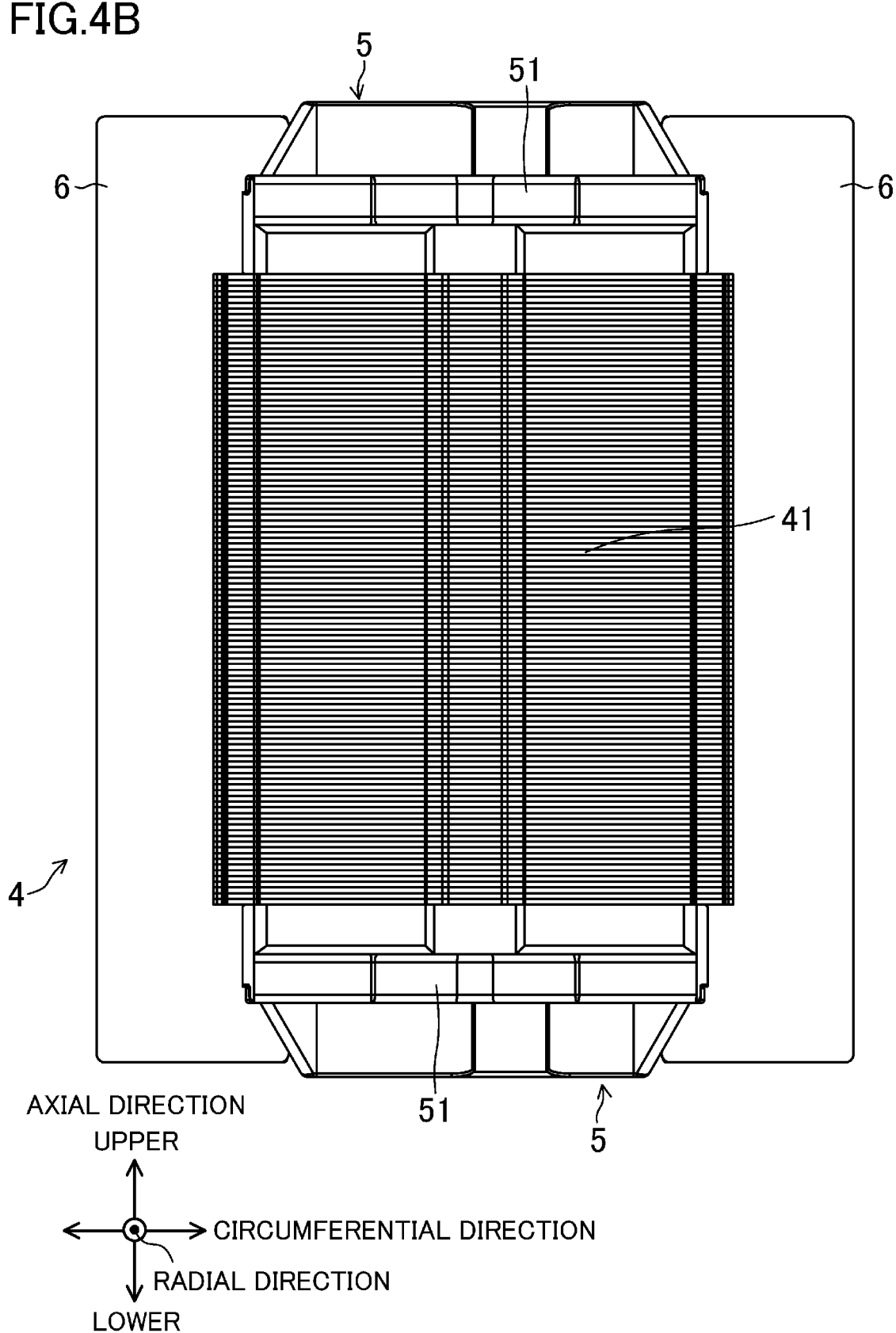
FIG. 4B is a side view of the structure shown in FIG. 4A as viewed in a radial direction.

FIGS. 4A to 4D show the part surrounded by a broken line in FIG. 1. FIG. 4A is a perspective view, FIG. 4B is a side view in the radial direction, FIG. 4C is a top view in the axial direction, and FIG. 4D is a side view in the circumferential direction. For convenience of description, none of FIGS. 4A to 4D shows the coil 7. The figures also show the insulating paper 6 sandwiched and attached among the insulators 5, the core segment 41, and the tooth 42. However, the insulating paper 6 shown here is before being folded to be housed in the slot 43.

As shown in FIGS. 4A to 4D, the insulators 5 in the same shape are attached to both the axially upper and lower end surfaces of the tooth 42 protruding from one core segment 41. The insulating paper 6 is sandwiched among the core segment 41, the tooth 42, and the insulators 5. In this manner, the insulators 5 cover both the axial end surfaces of the tooth 42 and the vicinities of both the end surfaces.

Each of the insulators 5 is an insulating member formed by molding an insulating resin material, and includes the part 50 to be wound with the coil 7 (see FIG. 5B), a first flange 51, and a second flange 52. The first flange 51 is formed at one end of the part 50. The second flange 52 is formed at the other end of the part 50. In this embodiment, the first flange 51 is attached closer to the core segment 41, whereas the second flange 52 is attached at the distal end of the tooth 42 located radially inward in relation to the stator 4. The first flange 51 has a coil guide groove 53. To be wound around the part 50, the winding wire of the coil 7 passes through the coil guide groove 53. The winding starting part comes into contact with an inner surface 51a of the first flange 51 (hereinafter referred to as the "inner surface 51a of the first flange 51") facing the second flange 52 so as to be guided to the part 50. In this specification, the winding starting part of the coil 7 corresponds to the vicinity of the first turn of the first layer of the coil 7 wound around the part 50.

Out of the outer circumferential surface of the part 50 to be wound with the coil, the outer circumferential surfaces 50a covering both the axial end surfaces of the tooth 42 are slopes. Each slope is inclined monotonically so that the height from the axially upper or lower surface of the tooth 42 increases from the first flange 51 toward the second flange 52. Out of the outer circumferential surface of the part 50 to be wound with the coil, outer circumferential surfaces 50c and 50d covering both the circumferential end surfaces of the tooth 42 are orthogonal to the axially upper surface of the tooth 42. The term "orthogonal" meant here includes the machining tolerances of the insulators 5 and the tooth 42, and the election tolerances when attaching the insulators 5 to the tooth 42. The term "parallel" meant here includes the machining tolerances of the insulators 5 and the election tolerances when attaching the insulators 5 to the tooth 42. These apply to the following description.

The inner surface 51a of the first flange 51 is parallel to a plane orthogonal to the axially upper or lower surface of the tooth 42.

The coil guide groove 53 includes a first groove 53a and a second groove 53b. The first groove 53a extends at an angle θ, where θ is acute, from the inner surface 51a of the first flange 51. The second groove 53b is continuous with the first groove 53a and located more radially inward in relation to the first groove 53a (see FIGS. 5A and 5B). The structure of the coil guide groove 53 will be described later in detail.

The insulators 5 function to electrically insulate the core 41 and the tooth 42 from the coil 7, together with the insulating paper 6. The insulators 5 also function to stably maintain the regular winding of the coil 7, which will be described later.

The insulating paper 6 is impregnated with an insulating oil, for example, covers both the circumferential side surfaces of the tooth 42, and partially overlaps the first and second flanges 51 and 52 of the insulators 5 in the axial direction. Although not shown in the figure, when the motor 1 is assembled, the insulating paper 6 is folded to cover the insides of the slots 43. This configuration electrically insulates the core segment 41 and the tooth 42 from the coil 7, and from the circumferentially adjacent core segments 41 and teeth 42.

[Configuration of Main Part of Insulator]

FIG. 5A is a schematic view of a main part of each insulator according this embodiment as viewed in the axial direction. FIG. 5B is a schematic view of the main part of the insulator wound with the coil as viewed in the axial direction. While the insulator 5 shown in FIGS. 5A and 5B is the same as that in FIGS. 4A to 4D, the structure of the insulator 5 is simply shown in FIGS. 5A and 5B for convenience of description.

As shown in FIGS. 5A and 5B, the second groove 53b is configured such that its radially outer side surface and the inner surface 51a of the first flange 51 form an angle θ1 as viewed in the axial direction. The angle θ1 is acute and smaller than or equal to θ.

The first flange 51 of the insulator 5 includes a first part 54 and a second part 55 in a region excluding the first groove 53a and the second groove 53b as viewed in the axial direction.

The radially inner surface of the first part 54 is a part of the inner surface 51a of the first flange 51, whereas the radially outer surface of the first part 54 serves as one side surface of the first groove 53a. That is, as viewed in the axial direction, the first part 54 is located between the first groove 53a and the part 50 to be wound with the coil. A first end 54a of the first part 54 is located at the opening end of the first groove 53a closer to the second flange 52, and faces the second part 55.

The radially inner surface of the second part 55 serves the radially outer side surfaces of the first and the second grooves 53a and 53b. That is, as viewed in the axial direction, the second part 55 is located between the second groove 53b and the part 50 to be wound with the coil. The radially inner surface of the second part 55 has a corner 55a and a corner 55b. The corner 55a is located at the boundary between the first and the second grooves 53a and 53b. The corner 55b is located at the boundary between the second groove 53b and the inner surface 51a of the first flange 51.

As shown in FIG. 5B, the coil 7 is housed in the coil guide groove 53 and is further guided to the part 50. At this time, as viewed in the axial direction, the coil 7 is guided at the angle θ from the inner surface 51a of the first flange 51 in the first groove 53a. Then, the coil 7 abuts on the corners 55a and 55b of the second part 55 from the boundary between the first and the second grooves 53a and 53b toward the part 50. The coil 7 is eventually guided to the part 50 at the angle θ1 from the inner surface 51a of the first flange 51 along the radially outer side surface of the second groove 53b.

Advantages of Embodiment

As described above, in each insulator 5 according to this embodiment, the first groove 53a of the coil guide groove 53 and the inner surface 51a of the first flange 51 form the acute angle θ. This configuration facilitates the winding of the coil 7 along the inner surface 51a of the first flange 51 and reduces winding failure at the winding starting part of the coil 7 to easily provide a regularly wound coil 7. This configuration also provides a regularly wound coil 7, even if its diameter is changed. In particular, the insulators 5 according to this embodiment are useful to regularly wind the coil 7 in n layers, where n is an integer of two or more.

Even if the diameter of the coil 7 is changed, there is no need to change the width of the groove for holding the coil 7 in the insulator as disclosed in Patent Document 2. There is also no need to change the width of the step or the angle of the slope in the insulator as disclosed in Patent Document 1. The configuration according to this embodiment reduces an increase in the manufacturing costs of the insulators 5. Even if coils 7 with different diameters are used together with the core segments 41 and the teeth 42 with the same specifications, the one type of insulators 5 suffices, thereby reducing the costs in developing various types of motors.

The configuration according to this embodiment reduces deformation, movement, and winding failure of the coil 7 at the winding starting part to easily provide a regularly wound coil 7.

FIG. 6A is a schematic view of a main part of a comparative insulator wound with a coil, as viewed in the axial direction. FIG. 6B is a schematic view of a main part of another comparative insulator as viewed in the axial direction.

As shown in FIG. 6A, the coil guide groove 53 with a smaller width is likely to cause radially inward deformation of the coil 7 at the boundary at which the coil 7 is guided from the coil guide groove 53 to the part 50. This is because the direction of winding of the coil 7 largely changes at the boundary. If such a deformation occurs, the winding starting part of the coil 7 is not regularly wound around the part 50, thereby failing to achieve regular winding of the coil 7.

As shown in FIG. 6B, the coil guide groove 53 with a greater width is less likely to cause the above-described deformation of the coil 7 at the boundary. In the process of regularly winding the coil 7 around the part 50, the coil 7 is wound tightly not to leave any gap between turns. A radially outward force is thus applied to the winding starting part of the coil 7. This force deforms the winding starting part of the coil 7 inside the coil guide groove 53, that is, radially outward. Accordingly, winding failure occurs at the winding starting part of the coil 7 like in FIG. 6A, thereby failing to achieve regular winding of the coil 7 around the part 50.

By contrast, as shown in FIG. 5B, in the insulator 5 according to this embodiment, the coil 7 obliquely enters the part 50 without significantly changing the width of the first groove 53a or the second groove 53b. This is less likely to cause radially inward deformation of the coil 7 at the boundary as shown in FIG. 6A. This is also less likely to cause radially outward deformation of the coil 7 at the boundary as shown in FIG. 6B. Accordingly, the configuration allows regular winding of the coil 7 around the part 50 from the winding starting part to provide a regularly wound coil 7.

In each insulator 5 according to this embodiment, the first groove 53a and the inner surface 51a of the first flange 51 form the angle θ. On the other hand, the radially outer side surface of the second groove 53b forms the angle θ1, where θ1≤θ, with the inner surface 51a of the first flange 51. This gradually reduces the angle at which the coil 7 enters the part 50, and allows tighter winding of the coil 7 along the inner surface 51a of the first flange 51. Even upon receipt of a radially outward force at the time of winding, the coil 7 comes into contact with the corner 55a of the second part 55 and to be less deformed. These improve the regularity of the winding starting part of the coil 7, thereby easily providing a regularly wound coil 7.

FIG. 7 is a schematic view of a main part of another insulator according to this embodiment as viewed in the axial direction. As shown in FIG. 7, in order to wind the coil 7 in the direction opposite to that in FIG. 5B, the first and second grooves 53a and 53b may be located in positions radially symmetrical with those shown in FIGS. 5A and 5B. In this case, the first flange 51 of the insulator 5 includes a second part 55 and a third part 56 in a region excluding the first groove 53a and the second groove 53b as viewed in the axial direction. The radially inner surface of the third part 56 is a part of the inner surface 51a of the first flange 51, whereas the radially outer surface of the third part 56 serves as one side surface of the first groove 53a. That is, as viewed in the axial direction, the third part 56 is located between the first groove 53a and the part 50 to be wound with the coil. A second end 56a of the third part 56 is located at the opening end of the second groove 53b closer to the second flange 52.

As shown in FIGS. 4A to 4D, the insulating paper 6 covers the insulator 5 and the tooth 42 to partially overlap the first and second flanges 51 and 52 and of the insulator 5 in the axial direction. The insulator 5 according to this embodiment includes the first and second grooves 53a and 53b to allow the coil 7 to obliquely enter the part 50. The coil 7 is thus woundable around the part 50 while avoiding the insulating paper 6. This reduces contact between the insulating paper 6 and the coil 7 near the first flange 51. This reduces damage of the insulating paper 6 and maintains insulation between the coil 7 and the tooth 42.

Application of the insulator 5 according to this embodiment to the stator 4 of the motor 1 shown in FIG. 1, for example, achieves regular winding of the coil 7, and reduces the dead space of the part 50 not wound with the coil 7. This increases the space factor of the coil 7 in the slot 43 and the efficiency of the motor 1.

Second Embodiment

In order to achieve regular winding of the coil 7, it is also important to fix the winding starting part of the coil 7 to reduce the deformation and movement of the winding starting part.

Figure 9:
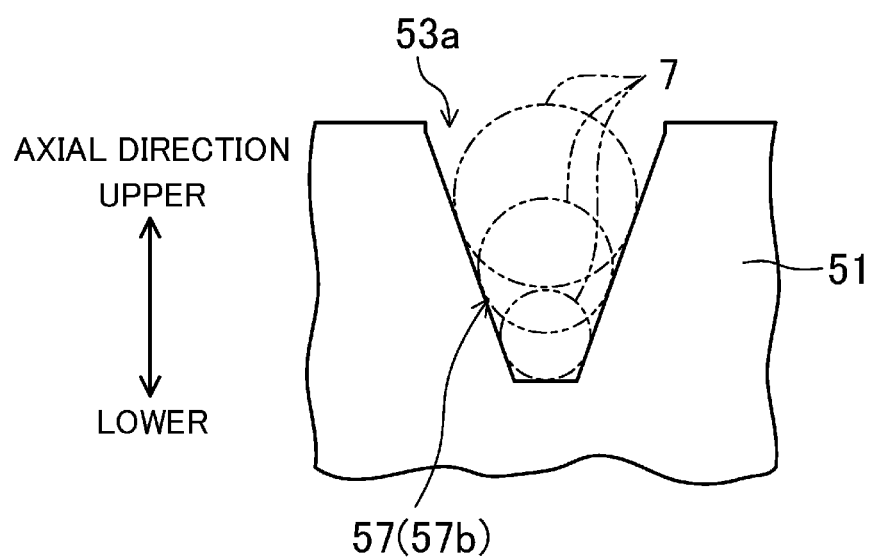
FIG. 9 is a schematic cross-sectional view of a first groove of another insulator according to the second embodiment.

FIG. 8 is a schematic view of a main part of an insulator according this embodiment as viewed in the axial direction. The coil guide groove 53 includes a coil lock 57. FIG. 9 is a schematic cross-sectional view of a first groove of another insulator according to a second embodiment, and corresponds to the cross section taken along line IX-IX of FIG. 5A. For convenience of description, the structure of the insulator 5 is simply shown in FIGS. 8 and 9.

As shown in FIG. 8, a protrusion 57a, which protrudes from the side surface of the first groove 53a into the groove, serves as the coil lock 57. The circumferential length of the protrusion 57a may be determined based on the width of the first groove 53a and the diameter of the coil 7, and adjusted to an extent not to excessively deform the coil 7. Such the projection 57a locks the coil 7 inside the first groove 53a, thereby reducing deformation or movement of the winding starting part of the coil 7. This improves the regularity of the winding start part of the coil 7, thereby easily providing a regularly wound coil 7. In particular, arrangement of the protrusion 57a at an inlet 53al of the first groove 53a, through which the coil 7 is guided from the outside of the insulator 5, allows more reliable locking of the winding start part of the coil 7 in the insulator 5. This is because the coil 7 bends radially to allow the force to concentrate at the contact between the protrusion 57a and the coil 7.

Note that one or more protrusions 57a may be provided on the side surface of the first groove 53a. Arrangement of the projections 57a on both the side surfaces or in a plurality of positions of the first groove 53a allows more reliable locking of the winding starting part of the coil 7 in the insulator 5.

As shown in FIG. 9, the first groove 53a may be tapered toward the bottom as a tapered groove 57b that serves as the coil lock 57. Employment of this configuration allows locking of the winding starting part of the coil 7 in the insulator 5 without changing the shape of the first groove 53a, even if the diameter of the coil 7 is changed. The whole or part of first grooves 53a may be tapered. If the protrusions 57a are arranged or the diameter of the coil 7 is substantially equal to the width of the first groove 53a, there is no need to taper the first groove 53a.

Tapering of the inlet 53al of the first groove 53 allows reliable locking of the winding starting part of the coil 7 in the insulator 5, as seen above.

The coil lock 57 at the inlet 53al of the first groove 53a also allows reliable locking of the winding starting part of the coil 7 in the insulator 5. The inlet 53al here corresponds to a radially outer end of the first groove 53a.

In the first and second embodiments, the corner 55a of the second part 55 is located more radially outward in relation to the inner surface 51a of the first flange 51 as viewed in the axial direction. Alternatively, the corner 55a may be located in the same position as the inner surface 51a. In this case, the coil 7 enters the part 50 to be wound at an angle θ.

In the first and second embodiments, an example has been described where the coil 7 starts to be wound from the first flange 51 located closer to the core segment 41 which is the proximal end of the tooth 42. The configuration is not particularly limited thereto. The coil 7 may start to be wound from the second flange 52 located on the distal end of the tooth 42. In this case, the second flange 52 has the coil guide groove 53. While an example has been described where the coil 7 is made of the winding wire with a circular cross section, the configuration is not particularly limited thereto. The coil 7 may be made of a winding wire with a quadrangular cross section, for example. How to wind the coil 7 is not particularly limited, and general nozzle winding or flyer winding may be employed, for example.

An example has been described where the insulators 5 are of what is called a split type and attached to the associated tooth 42 from above and below in the axial direction. The configuration is not particularly limited thereto. Each insulator 5 may have an integral structure including a tubular part 50 to be wound with the coil to cover the entire outer circumference of the tooth 42. Such an insulator 5 with an integral structure may be used, if the stator 4 is formed by attaching the teeth 42 to the respective core segments 41 afterwards, for example. Alternatively, the insulators 5 attached to one tooth from above and below need not to have the same shape. The insulator 5 at the winding starting point of the coil 7 only needs to have the coil guide groove 53 in the shape described in the first and second embodiments. The use of the insulators 5 attached to one tooth from above and below and having the same shape reduces the number of types of the insulators 5 to reduce the manufacturing costs, for example.

The outer peripheral surfaces 50a and 50b of the part 50 to be wound with the coil may be substantially parallel to the axially upper surface of the tooth 42. The inner surface 51a of the first flange 51 may be inclined radially outward with respect to a plane orthogonal to the axially upper or lower surface of the tooth 42 as a reference plane.

It is clear that the insulators 5 according to the first and second embodiments are applicable to the coil 7 wound in one layer.

An example has been described in the first and second embodiments where the insulators 5 according to the present invention are attached to the teeth 42 of the respective core segments 41 and the coils 7 are wound around the respective parts 50 to form the stator segments 40a. The insulators 5 according to the present invention may be attached to the respective teeth 42 of the ring stator core and wound the coils 7 are around the respective parts 50. The "ring stator core" here is formed by stacking plate bodies punched out of an electromagnetic steel sheet into ring shapes. The ring stator core has the plurality of teeth.

An example has been described in the first and second embodiments where each core segment 41 has one of the teeth. Alternatively, each core segment 41 may have two or more of the teeth.

An example has been described in the embodiment where the motor 1 of the first embodiment is used for an inner rotor motor.

As shown in FIG. 3, each tooth 42 has two recessed grooves at its distal end (i.e., the radially inner end). These recessed grooves are also referred to as "supplemental grooves" in U.S. Pat. No. 6,104,117 and Japanese Unexamined Patent Publication No. H10-42531, for example. The "supplemental grooves" are advantages in reducing cogging torque and torque ripple in the rotation operation of the rotor 3 of the motor 1, and contribute to reduced vibration, reduced noise, and other characteristics of the motor.

The winding wires in this embodiment are also referred to as electric wires for winding and commercially available. The conductors of the winding wires or electric wires for winding contain copper or aluminum with unavoidable impurities. Unavoidable impurities here mean a tiny amount of impurity elements unavoidably mixed into copper or aluminum during the manufacturing process. For copper, unavoidable impurities may be As, Bi, Sb, Pb, Fe, S, or oxygen, for example. For aluminum, unavoidable impurities may be Si, Mn, Ti, V, Zr, Fe, or Cu, for example. The conductors of the winding wires are covered with an insulating layer made of an insulating resin. As the insulating resin, for example, polyimide, polyamide-imide, polyester-imide, polyesteramideimide, polyamide, polyhydantoin, polyurethane, polyacetal, or an epoxy resin may be selected as appropriate in accordance with the specifications of the motor 1. The cross section of each winding wire may have various shapes, such as a substantially square shape and a substantially rectangular shape, besides the circular shape according the embodiments.

The material component of the magnets 31 according to the embodiment contains Fe or Fe and Co, as well as B and at least one kind of elements selected from the group consisting of Sc, Y and lanthanoid-based elements. Specifically, the magnets 31 are rare earth sintered magnets, what is called neodymium sintered magnets, for example. Each of the rare earth sintered magnets includes, as its surface layer, a rust-proof film (or a rust-proof layer) for reducing rust.

INDUSTRIAL APPLICABILITY

The insulator according to the present invention provides regularly wound coils, while accepting different diameters of the coils, and is thus useful for applications in, for example, motors required to have high efficiency.

DESCRIPTION OF REFERENCE CHARACTERS

1 Motor
2 Shaft
3 Rotor
4 Stator
5 Insulator
6 Insulating Paper
7 Coil
31 Magnet
40 Stator Core
40a Stator Segment
41 Core Segment
41c Yoke
42 Tooth
43 Slot
50 Part to Be Wound with Coil
51 First Flange
51a Inner Surface of First Flange 51
52 Second Flange
53 Coil Guide Groove
53a First Groove
53a1 Inlet of First Groove 53a
53b Second Groove
54 First Part
54a First End
55 Second Part
55a, 55b Corner
56 Third Part
56a Second End
57 Coil Lock
57a Projection
57b Groove
U1 to W4 Coil

The invention claimed is:
1. An insulator comprising:
a part to be wound with a coil, the part covering an axial end surface of a tooth protruding from a core segment and a part of at least both circumferential side surfaces of the tooth;
a first flange continuous with the part to be wound with the coil at one of sides closer to a proximal end and a distal end of the tooth, and including a coil guide groove that guides the coil to the part to be wound with the coil; and a second flange continuous with the part to be wound with the coil at the other of the sides closer to the proximal end and the distal end of the tooth, wherein the coil guide groove includes a first groove extending at an acute angle $\theta$ from an inner surface of the first flange facing the second flange, the coil guide groove further includes a second groove continuous with the first groove and located more radially inward in relation to the first groove, and an angle $\theta 1$ between a radially outer side surface of the second groove and the inner surface is acute and smaller than the angle $\theta$.

2. The insulator of claim 1, wherein the coil guide groove includes a coil lock that locks a winding starting part of the coil.

3. The insulator of claim 2, wherein
the coil lock is a protrusion from a side surface of the coil guide groove, and
the coil guide groove includes one or more protrusions including the protrusion.

4. The insulator of claim 3, wherein the coil lock is located at an inlet of the coil guide groove.

5. The insulator of claim 2, wherein the coil guide groove is a groove tapered toward a bottom, and the tapered groove serves as the coil lock.

6. The insulator of claim 5, wherein the coil lock is located at an inlet of the coil guide groove.

7. The insulator of claim 2, wherein the coil lock is located at an inlet of the coil guide groove.

8. A stator comprising:
insulators, each being the insulator of claim 1, on both axial end surfaces of teeth, each of which is the teeth of the core segment; and
a plurality of stator segments, each formed by winding the coil of a winding wire around the part to be wound with the coil of the insulator, wherein
the stator segments are connected to each other in a ring, and the teeth protrude radially inward in the ring.

9. The stator of claim 8, wherein the coil is regularly wound around the part to be wound with the coil.

10. The stator of claim 9, wherein
a space between circumferentially adjacent ones of the teeth serves as a slot that houses the coil, and
in the slot, insulating paper that insulates associated one of the core segments and associated one of the teeth from the coil covers a side surface of the associated one of the teeth and partially overlaps the first and second flanges of the insulator in the axial direction.

11. A motor at least comprising:
the stator of claim 10; and
a rotor including a rotary shaft located more radially inward in relation to the stator at a predetermined distance.

12. A motor at least comprising:
the stator of claim 9; and
a rotor including a rotary shaft located more radially inward in relation to the stator at a predetermined distance.

13. The stator of claim 8, wherein
a space between circumferentially adjacent ones of the teeth serves as a slot that houses the coil, and
in the slot, insulating paper that insulates associated one of the core segments and associated one of the teeth from the coil covers a side surface of the associated one of the teeth and partially overlaps the first and second flanges of the insulator in the axial direction.

14. A motor at least comprising:
the stator of claim 13; and
a rotor including a rotary shaft located more radially inward in relation to the stator at a predetermined distance.

15. A motor at least comprising:
the stator of claim 8; and
a rotor including a rotary shaft located more radially inward in relation to the stator at a predetermined distance.

* * * * *